United States Patent [19]

Ottesen et al.

[11] Patent Number: 5,283,521
[45] Date of Patent: Feb. 1, 1994

[54] METHOD AND SYSTEM FOR ADAPTIVE DIGITAL LINEARIZATION OF AN OUTPUT SIGNAL FROM A MAGNETORESISTIVE HEAD

[75] Inventors: Hal J. Ottesen; Gordon J. Smith, both of Rochester, Minn.

[73] Assignee: International Business Machines Corporation, Armonk, N.Y.

[21] Appl. No.: 888,573

[22] Filed: May 26, 1992

[51] Int. Cl.⁵ .................... G01R 33/12; G01N 27/82
[52] U.S. Cl. ................................. 324/225; 324/226
[58] Field of Search ............. 324/225, 202, 207.12, 324/207.21, 207.25, 226, 235, 251, 252; 364/571.01, 571.02, 571.04, 571.07, 573; 360/31; 369/53

[56] References Cited
U.S. PATENT DOCUMENTS

| | | | |
|---|---|---|---|
| 4,074,186 | 2/1978 | Flaherty | 324/222 |
| 4,443,822 | 4/1984 | Furtner | 360/67 |
| 4,564,869 | 1/1986 | Baumeister | 364/200 |
| 4,706,138 | 11/1987 | Jove et al. | 360/67 |
| 4,771,237 | 9/1988 | Daley | 324/202 |
| 4,891,725 | 2/1990 | Mowry | 360/113 |
| 4,967,298 | 10/1990 | Mowry | 360/113 |

FOREIGN PATENT DOCUMENTS

| | | | |
|---|---|---|---|
| 59-92411 | 5/1984 | Japan | B11B 5/09 |
| 61-208606 | 9/1986 | Japan | G11B 5/09 |
| 2-121104 | 5/1990 | Japan | G11B 5/09 |

*Primary Examiner*—Walter E. Snow
*Attorney, Agent, or Firm*—Duke W. Yee; Andrew J. Dillon

[57] ABSTRACT

A method and system includes digitally linearizing a digital output signal originating from a magnetoresistive sensor by detecting the digital output signal originating from the magnetoresistive sensor. A linearization factor is then correlated to the digital output signal. Then, the digital output signal is modified the linearization factor to linearize the digital output signal.

13 Claims, 4 Drawing Sheets

METHOD AND SYSTEM FOR ADAPTIVE DIGITAL LINEARIZATION OF AN OUTPUT SIGNAL FROM A MAGNETORESISTIVE HEAD

BACKGROUND OF THE INVENTION

1. Technical Field

The present invention relates in general to a method and system for reducing asymmetry and distortion in an output signal and in particular, to a method and system for reducing asymmetry and distortion in an output signal from a magnetoresistive sensor. Still more particularly, the present invention relates to a method and system for linearizing the output of a magnetoresistive sensor in a disk drive system.

2. Description of the Related Art

Magnetoresistive ("MR") sensors responsive to changes in resistivity brought about by the presence of magnetic fields are increasingly being employed as read transducers in magnetic disk drive heads mainly because the change of resistivity in such sensors is independent of disk speed, depending only upon the magnetic flux. A MR head is a magnetoresistive sensor that has a resistivity that is a function of the input flux. As the input flux increases, the resistance in the MR head decreases. The resulting MR resistance curve of the MR head resistivity is very nonlinear, and since the curve contains nonlinearities, the recording channel attached to the MR head will also contain distortions unless these nonlinearities may be compensated for.

One method of linearizing an output signal from a MR head involves utilizing analog circuits to compensate for the nonlinearities. For example, Jove, U.S. Pat. No. 4,706,138, discloses an analog circuit in FIG. 4 thereof for decreasing sensitivity to variations in the MR sensor resistance.

In accordance with an analog method of compensation, an operating point at the center of the most linear portion of the MR resistance curve for the MR head is the operating point usually chosen. The operating point is implemented in an analog circuit to linearize the output for a limited range around the operating point. One problem associated with this method is that component values in the analog circuit will drift with time. As a result, the analog circuit may no longer accurately linearize the output as time passes. Additionally, the MR resistivity curve for a particular MR head will also change over time. Consequently, outputs or different gains will result from changes in an MR head over time.

Furthermore, in a disk drive, many MR heads are normally switched into a single amplifier. Currently, the characteristics of multiple MR heads, i.e., gain, must be carefully matched. In attempting to match various MR heads, problems may occur if the signal sent to the amplifier from a MR head is too small or too large. For example, if the signal is too small, the amplifier may not increase the strength of the signal sufficiently, resulting in data errors. Additionally, too large a signal going into an amplifier will also cause errors in data retrieval. As a result, MR heads must be carefully matched such that all the MR heads in a disk drive have gains which are as close as possible to each other. Consequently, a MR head must often be discarded because its characteristics vary too far to be utilized with other available MR heads.

Therefore, it would be desirable to have a method and system for adaptively linearizing the output from a MR head while eliminating the problems associated with characteristics of components and the MR head itself changing over time.

SUMMARY OF THE INVENTION

It is therefore one object of the present invention to provide a method and system f or reducing asymmetry and distortion in an output signal.

It is another object of the present invention to provide a method and system for reducing asymmetry and distortion in an output signal from a magnetoresistive sensor..

It is yet another object of the present invention to provide a method and system for linearizing the output of a magnetoresistive sensor in a disk drive system.

The foregoing objects are achieved as is now described. A method and system are provided which include digitally linearizing a digital output signal originating from a magnetoresistive sensor by first detecting the digital output signal originating from the magnetoresistive sensor. Thereafter, a linearization factor is correlated to the digital output signal. Then, the digital output signal is modified utilizing the linearization factor to linearize the digital output signal.

The linearization factors may be determined by subjecting the magnetoresistive sensor to a varying magnetic field input and detecting the digital output signal originating from the magnetoresistive sensor in response to the varying magnetic field, wherein the digital output signal produced is a function of the varying magnetic field input. Then, the nonlinear gain constants may be calculated f rom the digital output signal, wherein each of the linearization factors corresponds to a selected operating point.

Additional objects, features, and advantages will become apparent in the written description which follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The invention described in this application may be utilized with all known mechanical configurations of disk drives or direct access storage devices ("DASD").

Figure 1:
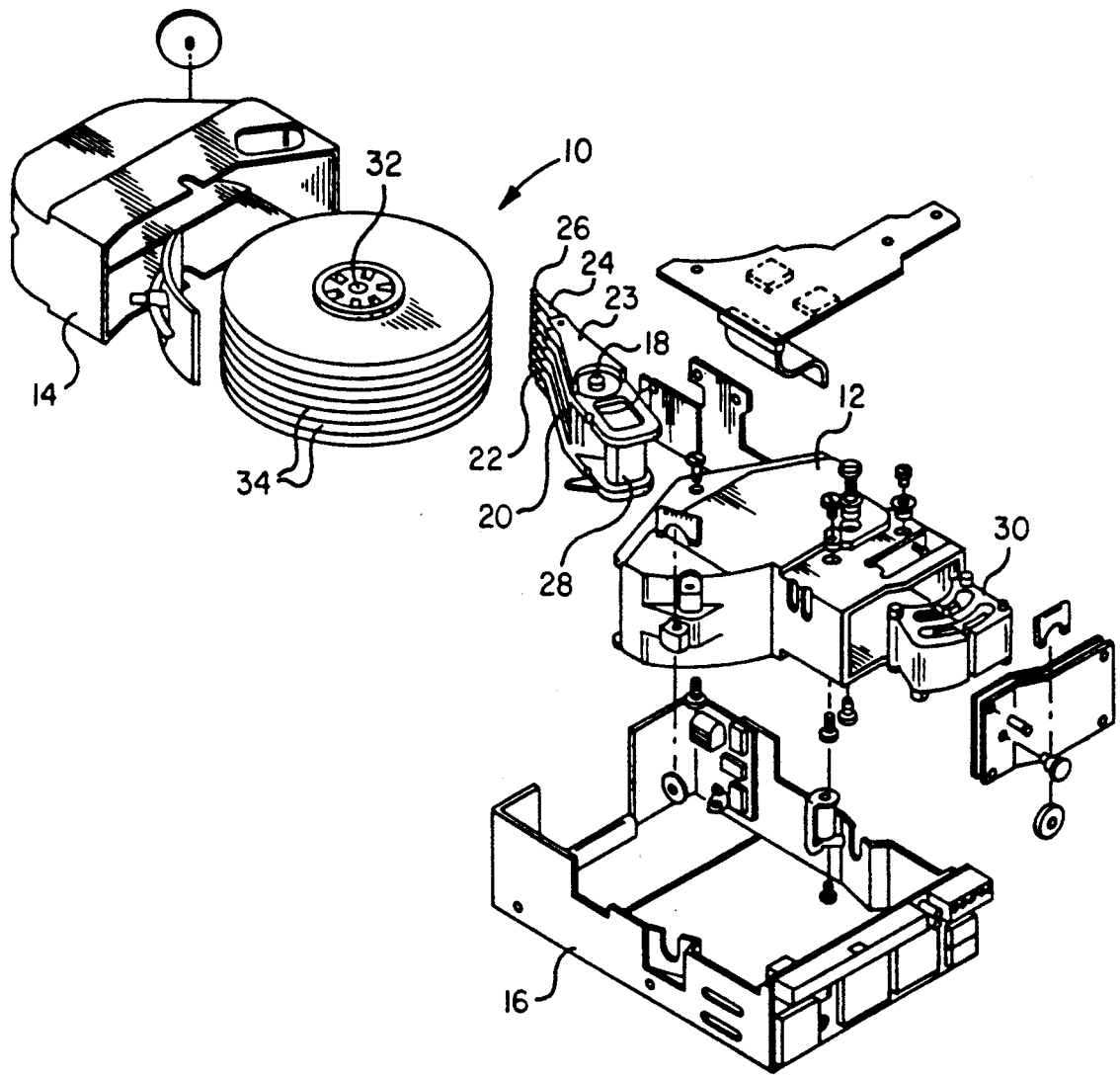
FIG. 1 depicts a pictorial representation of an exploded view of a disk drive system.

With reference now to the figures, and in particular with reference to FIG. 1, there is depicted a pictorial view of an exploded view of disk drive 10. It should be noted that although a rotary actuator is shown the invention described herein is also applicable to linear actuators. Disk drive 10 includes housing 12, and housing cover 14 which, after assembly, is mounted within frame 16. Rotatably attached within housing 12 on actuator shaft la is actuator arm assembly 20. One end of actuator arm assembly 20 includes an B block or comb-like structure 22 having arms 23. Attached to arms 23 on the comb-like or B block structure 22, are load springs 24. Attached at the end of each load spring is a slider 26, which carries a pair of magnetic elements which are a MR read head and a write head. On the other end of actuator arm assembly 20, opposite load springs 24 and sliders 26, is a voice coil 28.

Attached within housing 12 is a pair of magnets 30. Magnets 30 and voice coil 28 are key parts of a voice coil motor which apply a force to actuator assembly 20 to rotate it about actuator shaft 18. Also mounted within housing 12 is spindle shaft 32. Rotatably attached to spindle shaft 32 are a number of disks 34. In FIG. 1, eight disks are attached to spindle shaft 32. As shown in FIG. 1, disks 34 are attached to spindle shaft 32 in spaced apart relation. An internal motor (not shown) is utilized to rotate disks 34.

The MR head resistance response R(H) to a recorded magnetic field H(t) on a disk may be expressed as:

$$R\left(\frac{H(t)}{H_o}\right) = \frac{R_o}{1 + \left(\frac{H(t)}{H_o}\right)^2} \quad \text{Equation (1)}$$

where $R_o$ is a normalizing resistance of the MR head and $H_o$ is a normalizing magnetic field of the MR head.

As those skilled in the art will appreciate, both $R_o$ and $H_o$ are functions of the particular MR head utilized and are subject to manufacturing process variations.

Although the particular MR sensor described in the embodiment of the present invention is referred to as a MR head for use in a disk drive system, it contemplated that other types of MR sensors in other systems may be utilized in accordance with a preferred embodiment of the present invention. For example, an alternative embodiment of the present invention may include a MR sensor as a sensor for bubble memories instead of a disk drive.

Figure 2:
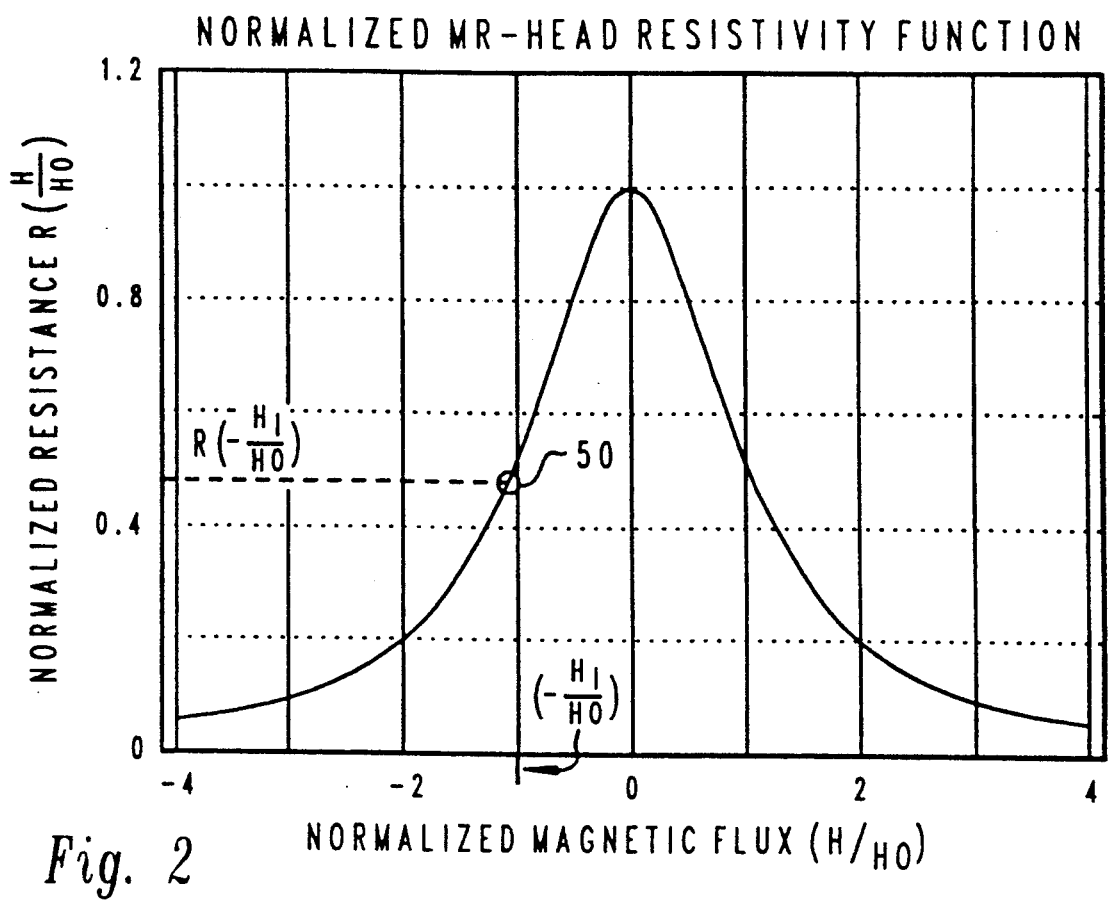
FIG. 2 is a graphic depiction of a typical normalized MR head resistance response.

Referring now to FIG. 2, there is depicted a graphic representation of a typical normalized MR head resistance response. This response departs from an ideal quadratic response because of magnetic saturation effects. These effects results in the Lorentzian shaped curve illustrated in FIG. 2.

An operating point on the MR head curve is obtained by supplying a constant bias current to the MR head which creates a constant magnetic plus bias field $H = -H_1$. An operating point is located in the center of the most linear portion of the MR head resistance curve. $R(H/H_o)$ is designated by the coordinates $[(-H_1/H_o), R-(H_1/H_o)]$ and is shown in FIG. 2 by point 50 on the MR head resistance curve.

In an analog method of compensation, the inverse resistance function, $R^{-1}(H/H_o)$ is utilized. For example, solving Equation (1) for the continuous magnetic field intensity H(t) yields:

$$H(t) = H_o \sqrt{\frac{R_o}{R\left(\frac{H(t)}{H_o}\right)} - 1} \quad \text{Equation (2)}$$

where t is continuous time.

Figure 3:
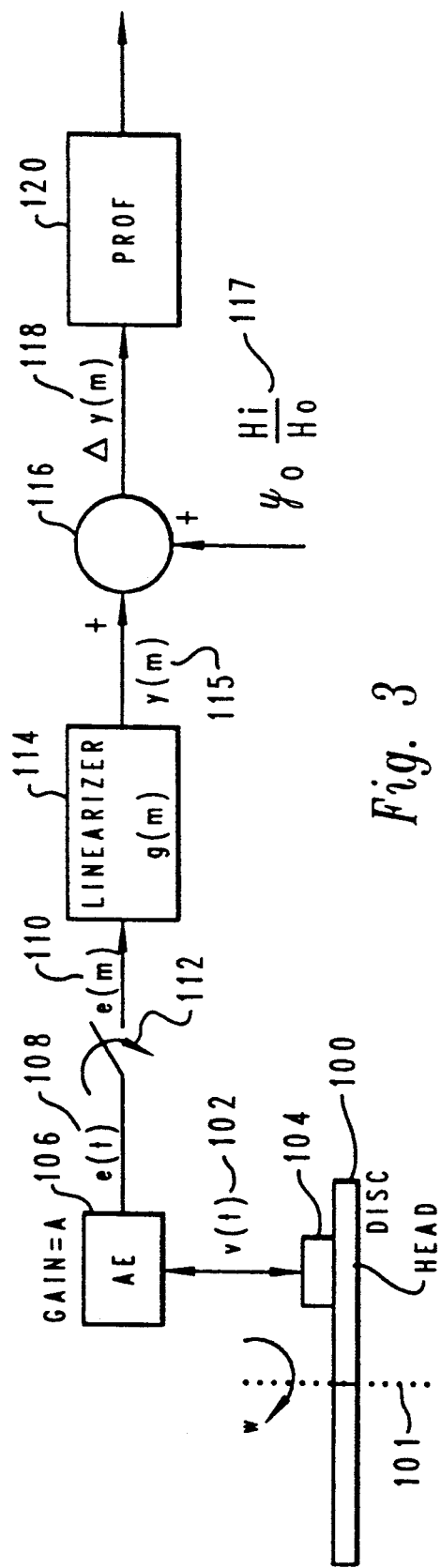
FIG. 3 depicts a typical linearized recording channel as known in the prior art.

Referring now to FIG. 3, there is depicted a typical linearized recording channel as known by those of ordinary skill in the art. Magnetic information on disk 100, spinning around axis 101 at an angular velocity of $\omega$ (radians/sec), causes an output voltage signal v(t) 102 to travel from MR head 104 to amplifier 106, which may be an Arm Electronics ("AE") preamplifier module. Amplifier 106 amplifies output voltage signal v(t) 102 by a gain of A, resulting in amplified signal e(t) 108, which is transformed into digital signal e(m) 110 by sampler 112. Thereafter, digitized signal e(m) 110 is linearized in linearizer 114, producing linearized signal y(m) 115.

Offset $Y_o$ ($H_1/H_0$) 117 is then removed from linearized signal y(m) 115 at summer 116, producing signal $\Delta y(n)$ 118, which then travels through Partial Response Digital Filter ("PRDF") 120 to form an output signal to be utilized in a data processing system. The offset is then utilized to remove the DC term from linearized signal 115. This DC term is an undesirable component originating from a voltage drop across the MR head caused by the bias current. PRDF is an equalizing digital filter and is part of the remainder of the magnetic recording channel.

Still referring to FIG. 3, the output voltage signal v(t) 102 from MR head 104, without the presence any magnetic fields supplied from the disk surface, is referred to as $V_o$ and is equal to the bias current times the MR head resistance. The voltage, $V_o$, is amplified by amplifier 106 with gain A. Sampler 112 samples the amplifier output, amplified signal e(t) 108, at fixed time intervals T at sampler 108, and converts the resulting sampled output, e(mT), to digital signal e(m) 110. In this case, m is utilized as the sampling index and is a positive integer.

Digital signal e(m) 110 passes through linearizer 106, implementing a linearizing algorithm whose output is a non-linear function of e(m) and is designated by y(m). Mathematically, this algorithm is described by:

$$y(m) = y_o \sqrt{\frac{E_o}{e(m)} - 1} = g(e(m)) \quad \text{Equation (3)}$$

where $y_o$ is some normalizing factor for the linearizer output Y(m), $E_o$, and $AV_o$. The symbol "g" utilized in the second expression of Equation (3) indicates the nonlinear functionality of the linearizer.

The equation for e(m) can be found from:

$$e(m) = A \cdot v(m) = \frac{E_o}{1 + \left(\frac{H(m)}{H_o}\right)^2} \quad \text{Equation (4)}$$

where H(m) can be thought of as the sampled version of the continuous field intensity H(t) in Equation (2). H(t) can be expressed as:

$$H(t) = -H_1 + \Delta H(t) \quad \text{Equation (5)}$$

where $\Delta H(t)$ is the recorded signal from the disk, while $H_1$ is the bias field provided by the bias current. The sampled digitized version of Equation (5) can be expressed as:

$$H(m) = -H_1 + \Delta H(m) \qquad \text{Equation (6)}$$

Substitution of (4) into (3) gives:

$$y(m) = y_o \frac{H(m)}{H_o} \qquad \text{Equation (7)}$$

Equation (7) shows that the algorithm described by Education (3) does indeed linearize the sampled MR head field H(M). Substitution of Equation (6) into Equation (7) gives:

$$y(m) = -y_o \frac{H_1}{H_o} + y_o \frac{\Delta H(m)}{H_o} \qquad \text{Equation (8)}$$

After linearization has been performed, the offset, $(Y_o) \cdot (H_1/H_o)$, generated by the bias current, may be removed to yield:

$$\Delta y(m) = \frac{y_o}{H_o} \Delta H(m) = y(m) + y_o \frac{H_1}{H_o} \qquad \text{Equation (9)}$$

Figure 4:
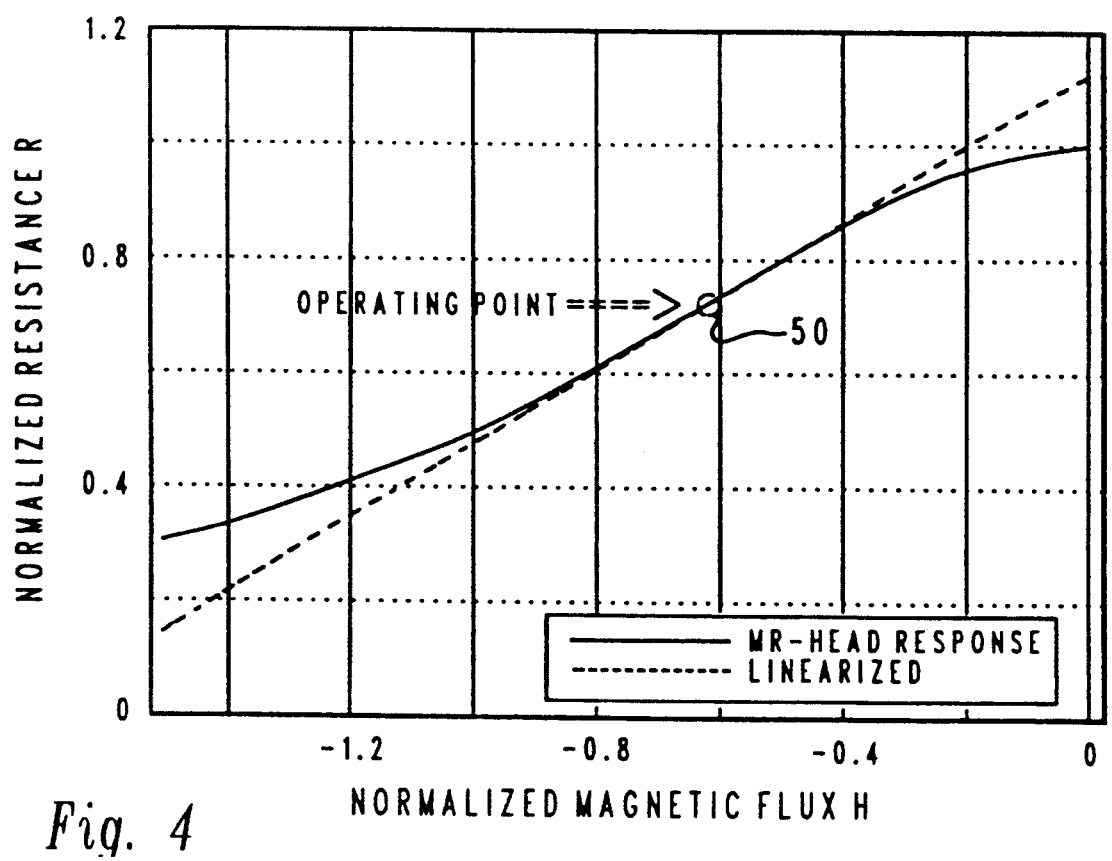
FIG. 4 is a graphic depiction of a normalized magnetic flux around operating point.

Equation (9) shows a direct linear relationship between the differential output of the linearizer $\Delta y(m)$ and the information carrying the recorded signal $\Delta H(m)$ on the disk. The effect of this algorithm is shown in FIG. 4, which depicts a normalized magnetic flux around operating point 50.

In accordance with a preferred embodiment of the present invention, multiple operating points may be linearized for a particular MR head. The closed form function for R(H) is not utilized as the basis for linearizing the output signal as described above in the analog case. Instead of assuming a closed form equation for MR head resistance, R (H(t)/H), as given by Equation (1), R(H(t)/H) is measured indirectly by utilizing digitized amplifier output e(m). e(m) is a function of H(m) as can be seen from Equation (4). These measurements may be obtained from an erased or unused portion of the disk, i.e. $\Delta H(m) = 0$, by incrementally changing the bias field H, and storing e(m) for each MR head. In this case, we see that Equation (6) gives $H(m) = -H_1$, an incrementally fixed value, and Equation (4) yields:

$$e(m) = e\left(\frac{-H_1}{H_o}\right) = \frac{E_o}{1 + \left(\frac{-H_1}{H_o}\right)^2} = \text{constant} + \text{noise} \qquad \text{Equation (10)}$$

For each incrementation of $H_1$, several values of $e(-H_1/H_o)$ may be collected and averaged to minimize the effect of the noise for the MR head in accordance with a preferred embodiment of the present invention. Usually, one or more MR heads are present for each disk surface, and four or more disks are generally utilized in a typical disk drive. This measurement may be made for each individual MR head in the disk drive.

Next, the subscript "i" is utilized as an integer to designate the individual MR heads. The results of these incremental measurements may be stored in a temporary (updatable) table as shown in Table 1.

TABLE 1

| Normalized Incremental bias $(-H_1/H_0)$ | Look-up Table for Linearization | | | |
|---|---|---|---|---|
| | $\bar{e}_1$ $(-H_1/H_0)$ | $\bar{e}_2$ $(-H_1/H_0)$ | $\bar{e}_3$ $(-H_1/H_0)$ | $\bar{e}_i$ $(-H_1/H_0)$ |
| 0.1 | ... | ... | ... | ... |
| 0.2 | ... | ... | ... | ... |
| 0.3 | ... | ... | ... | ... |
| ... | ... | ... | ... | ... |

Assume now, for example, that it has been decided to linearize the sampled averaged output $\bar{e}_i(-H_1/H_o)$ of the ith MR head. The equation for a line that is tangent to a point $[(-H_1/H_o), \bar{e}_i(-H_1/H_o)]$ on the $\bar{e}_i(-H_1/H_o)$ curve is given as follows:

Equation (11):

$$f_i\left(\frac{H}{H_o}\right) = \bar{e}_i{}'\left(-\frac{H_1}{H_o}\right)\left[\frac{H}{H_o} + \frac{H_1}{H_o}\right] + \bar{e}_i\left(-\frac{H_1}{H_o}\right)$$

where H H(t) is given by Equation (5).

In Equation (11), $\bar{e}_i{}'(-H_1/H_o)$ is the derivative of $\bar{e}_i(H/H_o)$ with respect to H, evaluated at $H = -H_1$. Next, a linearization factor or nonlinear gain constant $K_i(H/H_o)$ is found for head i to satisfy the following equation:

$$f_i\left(\frac{H(m)}{H_o}\right) = K_i\left(\frac{H(m)}{H_o}\right) e_i\left(\frac{H(m)}{H_o}\right) \qquad \text{Equation (12)}$$

This equation may also be written in terms of $K_i(H/H_o)$ as follows:

$$K_i\left(\frac{H(m)}{H_o}\right) = \frac{f_i\left(\frac{H(m)}{H_o}\right)}{e_i\left(\frac{H(m)}{H_o}\right)} \qquad \text{Equation (13)}$$

Now $f_i(H(m)/H_0)$ in Equation (11) may be calculated for each head and stored. $\bar{e}_i(H(m)/H_o)$ may be obtained from Table 1 by interpolation between values, and the nonlinear gain correction factor may be determined from Equation (11) and stored in a permanent form or one that may be updated. The results from Equation (13) may be stored in a look-up table as follows in Table 2:

TABLE 2

| Look-up Table for Gain Correction Factor for MR Head i | |
|---|---|
| $e_i (H(m)/H_0)$ | $K_i (H(m)/H_0)$ |
| ... | ... |
| ... | ... |
| ... | ... |

Figure 5:
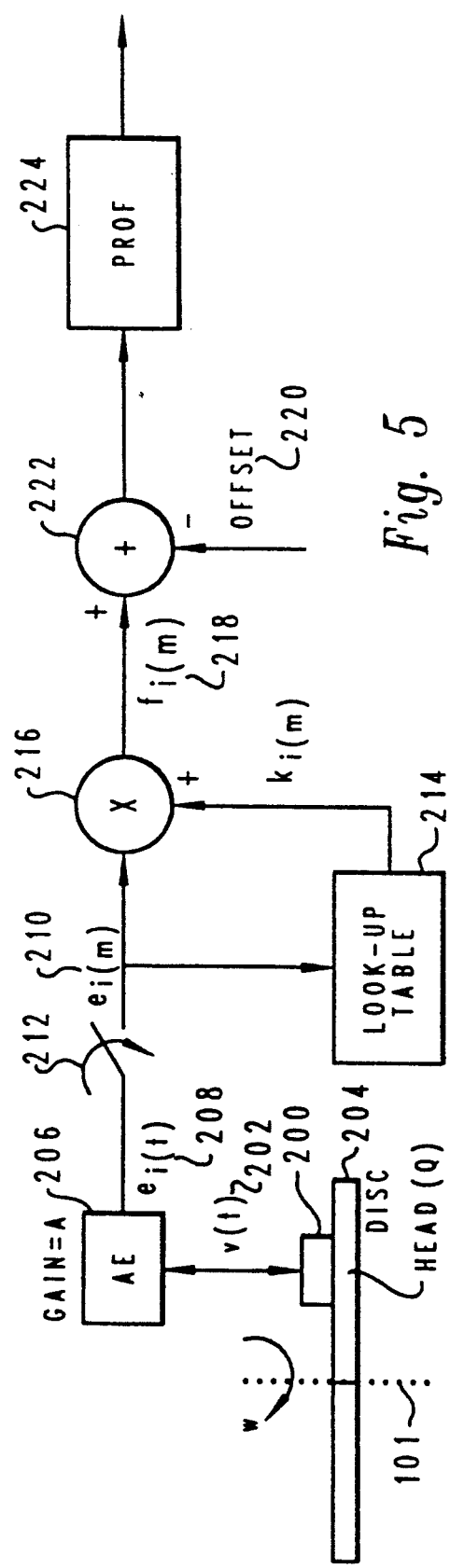
FIG. 5 depicts a diagram of a system for adaptive digital linearization of an MR head output in a recording channel utilizing a look-up table, in accordance with a preferred embodiment of the present invention.

Referring now to FIG. 5, there is depicted a diagram of a system for adaptive digital linearization of an MR head output in a recording channel utilizing a look-up table in accordance with a preferred embodiment of the present invention. MR head 200 produces electrical signal v(t) 202 in response to data on disk 204. Electrical signal 202 is amplified by amplifier 206 having a gain factor of A, producing amplified signal $e_i(t)$ 208. Amplified signal $e_i(t)$ 208 is converted into digital signal $e_i(n)$ 210 by sampler 212. The sampled value from the ith head, $e_i(m) = e_i(H(m)/H_o)$, is compared to Table 2 and the value of $K_i(H(m)/H_o)$ is determined by interpolation in look-up table 214, incorporating Table 2. This value for $K_i(H(M)/H_o)$ is multiplied by $e_i(H(m)/H_o)$ at multiplier 216 to yield the linearized value of $f_i(m)$ 218. As with the analog approach, the DC term is removed by offset 220 at summer 222 before the signal is fed into PRDF 224.

Figure 6:
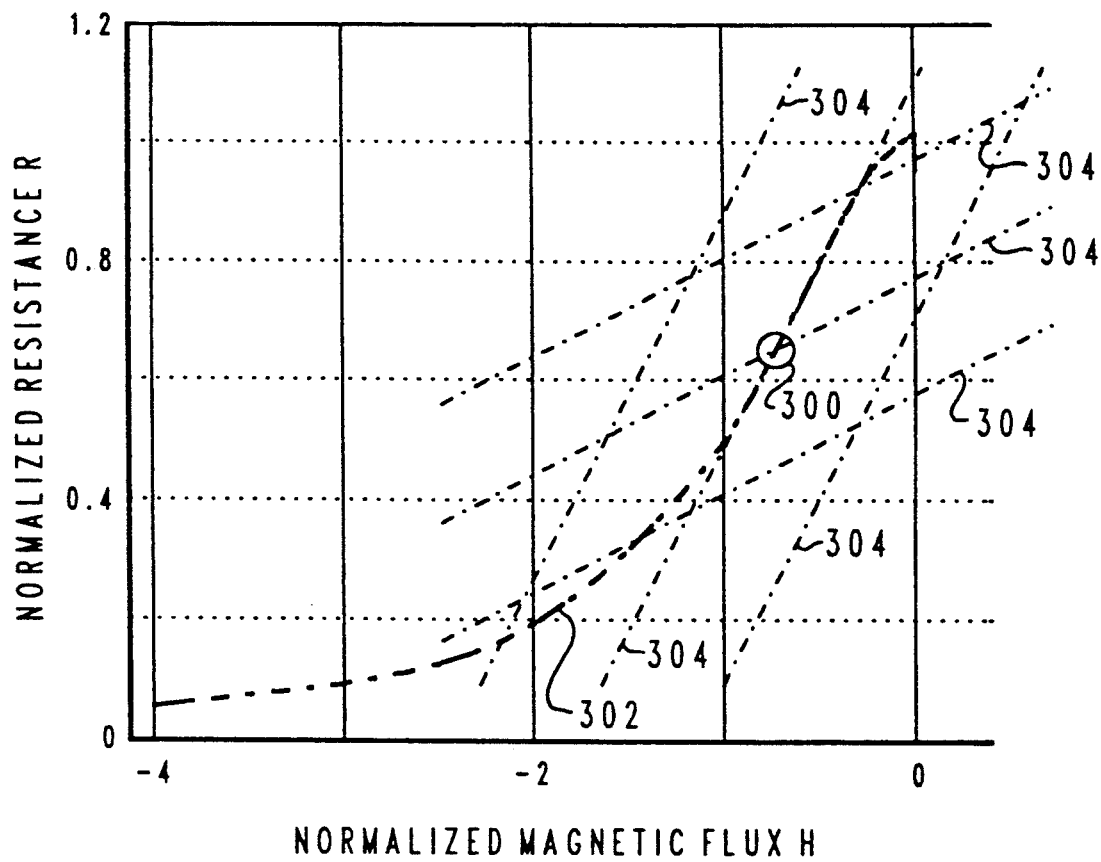
FIG. 6 is a graphic depiction illustrating a linearization gain factor K around an operating point in accordance with a preferred embodiment of the present invention.

Referring now to FIG. 6, there is depicted a graph illustrating the linearization gain factor K around operating point 300 in accordance with a preferred embodiment of the present invention. Curve 302 represents the normalized MR head resistivity for a MR head with lines 304 illustrating various lines tangent to and off curve 302.

One advantage of the present invention is that no assumptions need to be made with regard to the mathematical approximation of the MR nonlinearity since linearization is achieved by table look-up or a generalized mathematical representation of the MR function that may be optimized for every MR head.

Another advantage of the present invention is that the measurements of the MR head, utilized to determine linearization coefficients for digital linearization, may be made during manufacture of the MR head and stored for use with the linearizer as described above. Additionally, these measurements may be made after manufacturing to take into account changes over time in the MR head. In other words, the adaptive feature of the present invention allows for the monitoring and correcting of changes in the required linearization. For example, changes in the MR response due to electromigration, external fields, wear, and physical damage may be compensated for in accordance with a preferred embodiment of the present invention.

In accordance with a preferred embodiment of the present invention, multiple MR sensors, having varying characteristics and utilized for data retrieval in a system such as a disk drive, may be adjusted such that the signals obtained from a recording channel would be identical. In other words, the gain of all the MR heads could be made equal such that which particular MR head was being utilized to retrieval data could not be distinguished externally from analyzing the output signal.

In addition to matching MR heads in a disk drive, the present invention also provides the capability to match the MR head to the particular disk in which the MR head will be utilized. This capability is important because the disk has a magnetic coating on it that may vary in quality from disk to disk. The signal amplitude is proportional to several parameters relating to the coating. For example, one parameter includes the magnetic corrosivity of the disk magnetic layer. This corrosivity changes from disk to disk, causing different signal gains. Thus, one disk drive may contain a good disk surface and poor MR heads or a poor disk surface and good MR heads. In accordance with a preferred embodiment of the present invention, the signals from a disk drive may be set such that the gain is always the same regardless of the MR head characteristics or the disk characteristics.

Furthermore, the particular "linearization line" need not be tangent to the bias operating point. In fact, the line position and slope can be positioned individually for each head in accordance with a preferred embodiment of the present invention.

Next with regard to instability of MR heads, observations show that this instability that may be exacerbated by low bias currents utilized to bias a MR head, while higher bias currents may reduce instability but increases nonlinearity caused by higher bias currents. The method and system for adaptive digital linearization in accordance with a preferred embodiment of the present invention eliminates the need for these tradeoffs because for a given MR head, a operating point may be set giving minimal instability without the problem of nonlinearity.

The present invention also allows for a given MR head to be utilized to its ultimate potential because different MR heads with different sensitivities or gains may be made show the same sensitivity to the input of the recording channel. Moreover, the asymmetry in a MR head may be essentially eliminated regardless of the operating point chosen.

In addition, the present invention may be utilized to determine when a file on a disk might fail. This feature may be accomplished by examining a history of changes in the tables constructed in accordance with a preferred embodiment of the present invention over a period of time. Thus, data could be removed from an area on the disk that seems likely to fail.

While the invention has been particularly shown and described with reference to a preferred embodiment, it will be understood by those skilled in the art that various changes in form and detail may be made therein without departing from the spirit and scope of the invention.

What is claimed is:

1. A system for linearizing a digital output signal originating from a magnetoresistive sensor having a nonlinear response to an input flux, said system comprising:

means for detecting said digital output signal originating from said magnetoresistive sensor in response to said input flux;

means for correlating one of a plurality of linearization factors located in a storage means to said digital output signal in response to detecting said digital output signal, wherein said plurality of linearization factors is determined by:

means for subjecting said magnetoresistive sensor to a varying magnetic field input;

means for detecting said digital output signal originating from said magnetoresistive sensor in response to said varying magnetic field, wherein said digital output signal is a function of said varying magnetic field input; and means for calculating each of said plurality linearization factors from said digital output signal by $$K\left(\frac{H(m)}{H_0}\right) = \frac{f\left(\frac{H(m)}{H_0}\right)}{e\left(\frac{H(m)}{H_0}\right)}$$

where $K(H(m)/H_o)$ is a linearization factor, $f(H(m)/H_o)$ is a line through a point, $\bar{e}(H(m)/H_o)$ is a sampled averaged output from said magnetoresistive sensor, $H(m)$ is a sampled magnetic field intensity and $H_o$ is a normalizing magnetic field of said magnetoresistive sensor; and means for modifying said digital output signal utilizing said one of plurality of linearization factors to produce a linear digital output signal.

2. The system of claim 1, further including a storage means for storing said plurality of linearization factors.

3. The system of claim 2, wherein said storage means includes a look-up table containing said plurality of linearization factors.

4. The system of claim 3, wherein each of said plurality of linearization factors corresponds to a selected operating point for said magnetoresistive sensor.

5. A method for digitally linearizing a digital output signal originating from a magnetoresistive sensor, said digital output signal caused by a varying magnetic field detected by said magnetoresistive sensor, said method comprising:
  detecting said digital output signal originating from said magnetoresistive sensor;
  correlating one of a plurality of linearization factors to said digital output signal in response to detecting said digital output signal, wherein said plurality of linearization factors is determined by:
    subjecting said magnetoresistive sensor to a varying magnetic field input;
    detecting said digital output signal originating from said magnetoresistive sensor in response to said varying magnetic field, wherein said digital output signal is a function of said varying magnetic field input; and
    calculating each of said plurality of linearization factors from said digital output signal by $$K\left(\frac{H(m)}{H_0}\right) = \frac{f\left(\frac{H(m)}{H_0}\right)}{e\left(\frac{H(m)}{H_0}\right)}$$

where $K(H(m)/H_o)$ is a linearization factor, $f(H(m)/H_o)$ is a line through a point, $\bar{e}(H(m)/H_o)$ is a sampled averaged output from said magnetoresistive sensor, $H(m)$ is a sampled magnetic field intensity, and $H_o$ is a normalizing magnetic field of said magnetoresistive sensor, wherein each of said plurality of linearization factors corresponds to a particular one of a plurality of operating points; and
  modifying said digital output signal with said one of said plurality of linearization factors to linearize said digital output signal.

6. The method of claim 5, wherein said plurality of linearization factors are located in a storage device.

7. The method of claim 6 further comprising correlating one of said plurality of linearization factors to said digital output signals as said digital output signal varies.

8. The method of claim 7, wherein said magnetoresistive sensor is a magnetoresistive head in a disk drive system.

9. A computer program product for linearizing a digital signal originating from a magnetoresistive sensor having a nonlinear response to an input flux, said computer program product comprising:
  instruction means for detecting said signal originating from said magnetoresistive sensor;
  instruction means for correlating one of a plurality linearization factors located in a storage means to said digital signal in response to detecting said signal, wherein said plurality of linearization factors is determined by instruction means for subjecting said magnetoresistive sensor to a varying magnetic field input;
  instruction means for detecting said digital signal originating from a magnetoresistive sensor in response to said varying magnetic field, wherein said digital signal is a function of said varying magnetic field input; and
  instruction means for determining each of said plurality of linearization factors from said digital output signal by $$K\left(\frac{H(m)}{H_0}\right) = \frac{f\left(\frac{H(m)}{H_0}\right)}{e\left(\frac{H(m)}{H_0}\right)}$$

where $K(H(m)/H_o)$ is a linearization factor, $f(H(m)/H_o)$ is a line through a point, $\bar{e}(H(m)/H_o)$ is a sampled averaged output from said magnetoresistive sensor, $H(m)$ is a sampled magnetic field intensity, and $H_o$ is a normalizing magnetic field of said magnetoresistive sensor, wherein each of said plurality of linearization factors corresponds to a particular one of a plurality of operating points; and
  instruction means for modifying said digital signal utilizing said one of said plurality linearization factors to produce a linear digital signal.

10. A disk drive for storing data comprising:
  a disk;
  a slider;
  a magnetoresistive sensor attached to said slider for reading data located on said disk;
  means for linearizing a digital output signal originating from said magnetoresistive sensor, said means for linearizing being electrically connected to said magnetoresistive sensor and comprising:
    means for detecting said digital output signal originating from said magnetoresistive sensor,
    means for a correlating a linearization factor to said digital output signal in response to detecting said digital output signal, wherein said plurality of linearization factors, is determined by:
      means for subjecting said magnetoresistive sensor to a varying magnetic field input;
      means for detecting said digital output signal originating from said magnetoresistive sensor in response to said varying magnetic field, wherein said digital output signal is a function of said varying magnetic field input; and
      means for calculating said linearization factor from said digital output signal, wherein said means for determining said linearization factor includes calculating each linearization factor by $$K\left(\frac{H(m)}{H_0}\right) = \frac{f\left(\frac{H(m)}{H_0}\right)}{e\left(\frac{H(m)}{H_0}\right)}$$

where $K(H(m)/H_o)$ is a linearization factor, $f(H(m)/H_o)$ is a line through a point, $\bar{e}(H(m)/H_o)$ is a sampled averaged output from said magnetoresistive sensor, H(m) is a sampled magnetic field intensity, and $H_o$ is a normalizing magnetic field of said magnetoresistive sensor; and means for modifying said digital output signal utilizing said linearization factor to produce a linear digital signal.

11. The disk drive of claim 10 further including a storage means for storing said plurality of linearization factors.

12. The disk drive of claim 11, wherein said storage means includes a look-up table containing said plurality of linearization factors.

13. The disk drive of claim 12, wherein each of said plurality of linearization factors corresponds to a selected operating point for said magnetoresistive sensor.

* * * * *